United States Patent [19]
Lawson et al.

[11] 3,890,858

[45] June 24, 1975

[54] WIRE STRIPPER

[75] Inventors: Gustaf Rudolph Lawson, Willingboro, N.J.; John H. Stuart, Levittown, Pa.

[73] Assignee: AMP Incorporated, Harrisburg, Pa.

[22] Filed: May 20, 1974

[21] Appl. No.: 471,414

[52] U.S. Cl. .................. 81/9.5 R; 81/322; 81/337; 81/341
[51] Int. Cl. ............................................ H02q 1/12
[58] Field of Search ........... 81/9.5 R, 341, 318, 329, 81/322, 330, 323, 331, 324, 332, 333, 393, 337, 338; 30/90.1

[56] References Cited
UNITED STATES PATENTS

| | | | |
|---|---|---|---|
| 1,426,553 | 8/1922 | Cruickshank | 81/341 |
| 1,561,833 | 11/1925 | Cruickshank | 81/341 |
| 2,760,390 | 8/1956 | Ayer | 81/9.5 R |
| 2,863,158 | 12/1958 | Miller | 81/341 X |
| 2,968,096 | 1/1961 | Bonito et al. | 81/9.5 R |
| 3,013,456 | 12/1961 | Ericson | 81/338 |
| 3,041,712 | 7/1962 | Wurzel | 81/341 X |
| 3,130,616 | 4/1964 | Miller | 81/330 X |

*Primary Examiner*—Al Lawrence Smith
*Assistant Examiner*—Roscoe V. Parker, Jr.
*Attorney, Agent, or Firm*—William J. Keating; Jay L. Seitchik; Frederick W. Raring

[57] ABSTRACT

A wire stripper having an elongated lever which is pivotally connected thereto for movement into and out of engagement with a plurality of detents to limit the extent to which the handles and the jaws of the wire stripper are spread. A stop element on one of the handles of the wire stripper limits the extent to which the jaws can be closed to strip the insulation from a wire of predetermined thickness without cutting the conductor therein.

11 Claims, 11 Drawing Figures

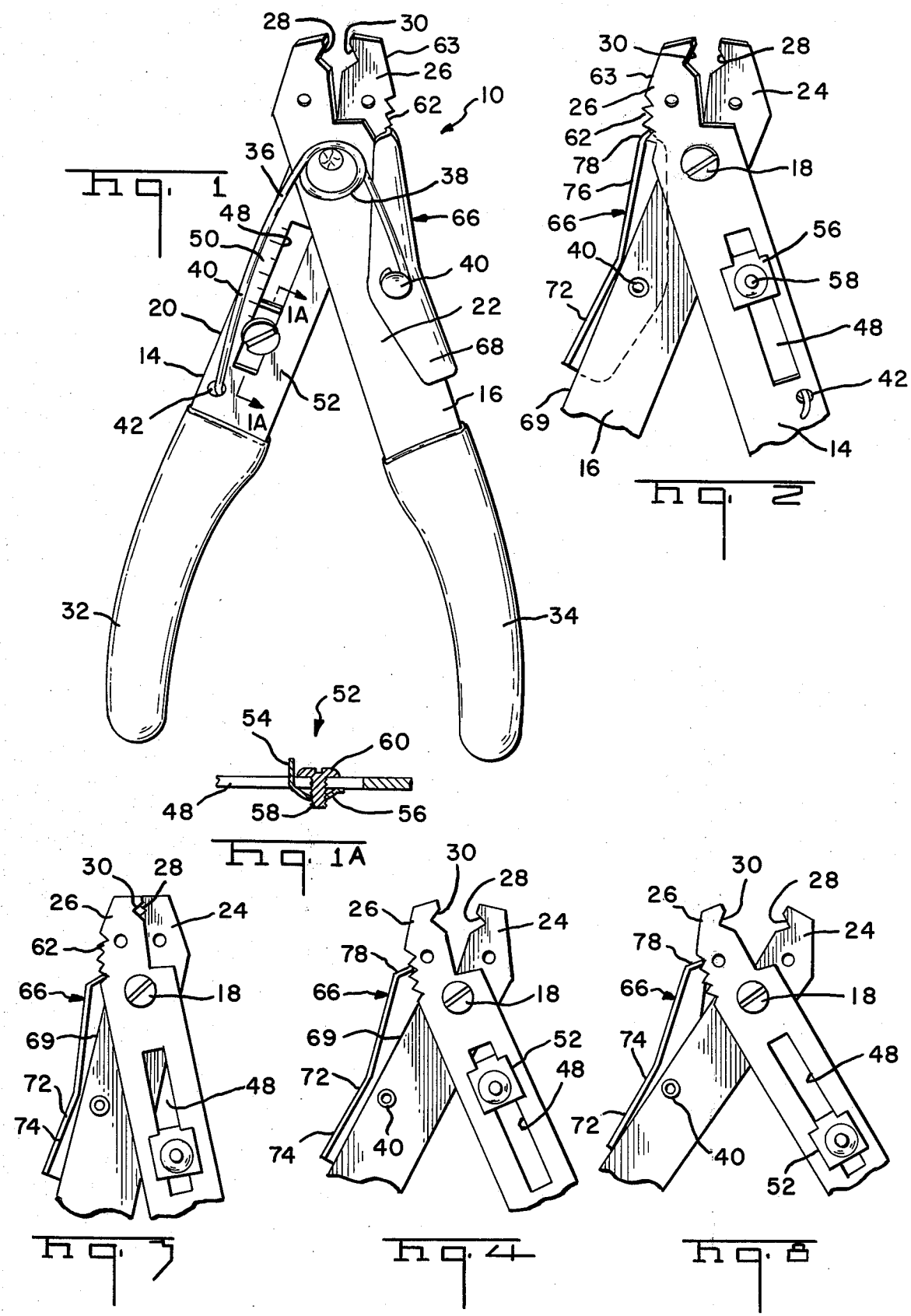

WIRE STRIPPER

This invention relates to a wire stripper and more particularly to a wire stripper having means for limiting the movement of the parts thereof through a range having a maximum and a minimum so that it can be preset so that a wire can be stripped without cutting the conductor therein and so that it handles can be restrained against opening to such an extent that they can not be grasped.

Wire stripping tools presently in use have their jaws biased to a normally open position by a spring like member. This so that the jaws can be opened by merely releasing pressure on the handles in order to place the wire strippers over a wire. The wire is stripped by merely closing the jaws over the wire to cut the insulation. The insulation is then pulled longitudinally off of the conductor. In this regard, most wire strippers have some sort of stop for limiting the extent to which the jaws can be closed to prevent the conductor from being cut.

However, prior art devices are deficient in a number of respects. Thus, there is no means for preventing the handles from opening to a point where they cannot be readily gripped by a user.

Further, no means are provided for preventing the handles of the wire stripper from opening unless the stop which limits the extent to which the handles can be closed has been relocated to the position which enables the handles to close to their fullest extent. Consequently, when one is finished using a wire stripper of the type known in the prior art, it is placed in storage without the handles and jaws being restrained against further movement. This is not desirable since the jaws of the wire stripper are exposed and they can be damaged. Further, the spring which biases the jaws apart could be damaged if the handles are opened beyond the extent to which they were designed.

Additionally, prior art devices suffer from the fact that the top which limits the extent to which the handles and jaws come together is a simple screw which is retained in a slot in one of the handles by a nut. The screw and nut are moved along the slot and then tightened at a predetermined position to thereby limit the extent to which the jaws and handles can be brought together. However, considerable difficulty is encountered in accurately locating this screw because it tends to "walk" along the slot as it is being tightened. Thus, while it may be accurately located prior to being tightened, often, as it is tightened, it changes position in the slot, thereby creating substantial inconvenience and difficulty and, if not detected in time, damage to conductors in wires being stripped.

The present invention obviates the problems outlined above by providing a wire stripper of the general type known heretofore but comprising means for selectively limiting the maximum extent to which the handles thereof can be spread over a predetermined range. Further, the present invention also obviates other problems associated with devices known in the prior art by providing a stop member comprising first and second members, one of which extends through the aforementioned slot and the other which is secured to the wire stripper by way of a suitable fastener.

BRIEF DESCRIPTION OF THE DRAWINGS

For the purpose of illustrating the invention, there are shown in the drawings a form which is presently preferred; it being understood, however, that this invention is not limited to the precise arrangements and instrumentalities shown.

FIG. 1 is a side elevational view of a wire stripper constructed in accordance with a presently preferred form of the invention.

FIG. 1A is a sectional view taken along line 1A—1A of FIG. 1.

FIGS. 2, 3 and 4 are side elevational views of the opposite side of the wire stripper shown in FIG. 1 showing the handles locked against spreading while in different positions.

FIG. 8 is a side elevation view of the wire strippers illustrated in FIG. 1 showing the handles thereof spread to their maximum extent.

DETAILED DESCRIPTION OF THE EMBODIMENTS

Figure 5:
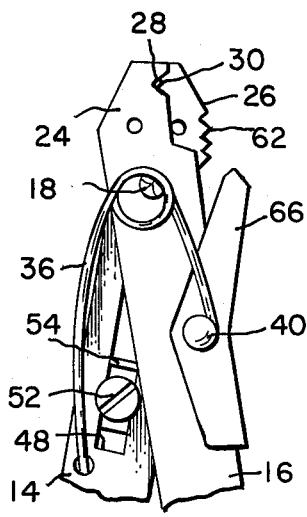
FIGS. 5, 6 and 7 show the jaws of the wire stripper stopped in varying positions in order to strip the insulation from conductors of different diameters.

In FIG. 1, a wire stripper 10 constructed in accordance with a presently preferred form of the invention is illustrated. It includes first and second arms 14 and 16 which are connected for relative pivotal movement by a suitable pivot pin 18. The pin may be a rivet, or any other suitable fastener.

The pivot pin divides each arm into a handle portion 20 and 22 and a jaw 24 and 26. Each jaw in turn is provided with facing notches 28 and 30 which are generally V-shaped. The jaws and notches are honed to a sharp edge so that when they are brought together in scissors-like fashion to cut through the insulation on a wire to be stripped.

At their distal ends, each of the handles 20 and 22 may be provided with grips 32 and 34 for the comfort and safety of the person using the wire stripper. The grips may be made from a thermoshrinkable plastic material. Arms 14 and 16 are biased by a biasing means to an open position about pivot pin 18 as illustrated. The biasing means may be any suitable resilient means. Preferably it is a torsion spring 36 having a coil 38 disposed near pivot pin 18. One end 40 of spring 36 is anchored to arm 14 near grip 32 by being inserted through an aperture 42 therein. Its other end 44 is secured to arm 16 at pin 46.

An elongated slot 48 is disposed in arm 14 between grip 32 and pivot pin 18. A scale defined by a plurality of graduations 50 is located on arm 14 alongside the slot.

A stop member 52 is coupled to arm 14 for movement along the slot. The stop member comprises a first element 54 which extends upwardly through the slot. It is coupled to a second element 56 which is disposed below the slot. The second element 56 is somewhat wider than the slot as illustrated in FIG. 2 so that while element 54 can pass through the slot, element 56 cannot. Further, element 56 may be bowed so that its midportion is spaced from the arm and it is provided with a central aperture through which the shank 58 of a screw 60 can be threadingly received in order to lock the stop member at any convenient location along the slot. In this regard element 56 substantially eliminates the problem associated with using the screw and nut.

It should be noted that the first element 54 extends through the slot and can be located by reference to the graduations 50. Further, element 54 provides a surface which is engaged by arm 16 in order to limit the movement of that arm toward arm 14.

Means are provided for limiting the maximum extent to which the handle portions 20 and 22 of arms 14 and 16 can be opened over a predetermined range. These means include a plurality of detents comprising notches 62 which are arranged in linear array along the back face 63 of jaw 30.

The notches are engageable with an elongated member 66 which may be pivotally connected to arm 16 by a suitable member such as the aforementioned pin 46.

Figure 10:
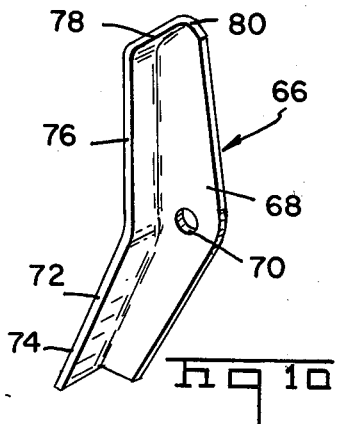
FIG. 10 is a perspective view of a portion of the wire stripper.

As best illustrated in FIG. 10, elongated member 66 comprises a first portion 68 having an aperture 70 there-through for receiving pin 46 so that it lies alongside arm 16 adjacent its back face 69 (FIGS. 3, 4 and 8).

A second portion 72 is disposed along an edge of portion 68 and may be formed integrally therewith. Portion 72 is generally V-shaped in that it has two surfaces 74 and 76 which are angularly disposed with respect to each other. The end of surface 76 remote from its juncture with surface 74 is bent at 78 to provide an edge 80 which may engage the notches 62.

Figure 6:
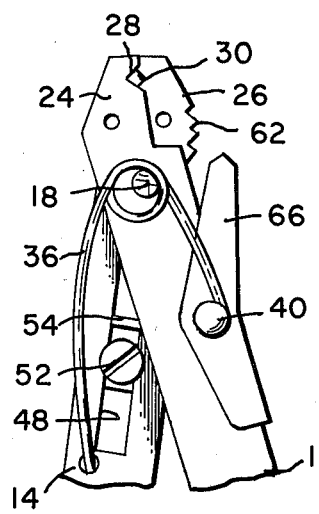
Figure 7:
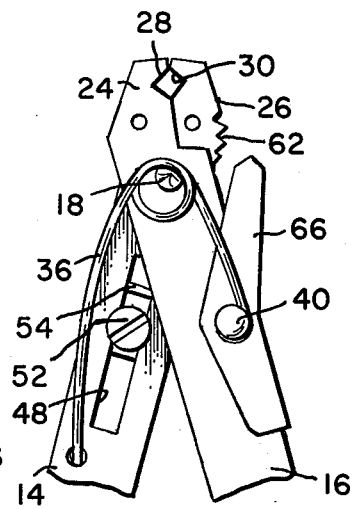
Figure 9:
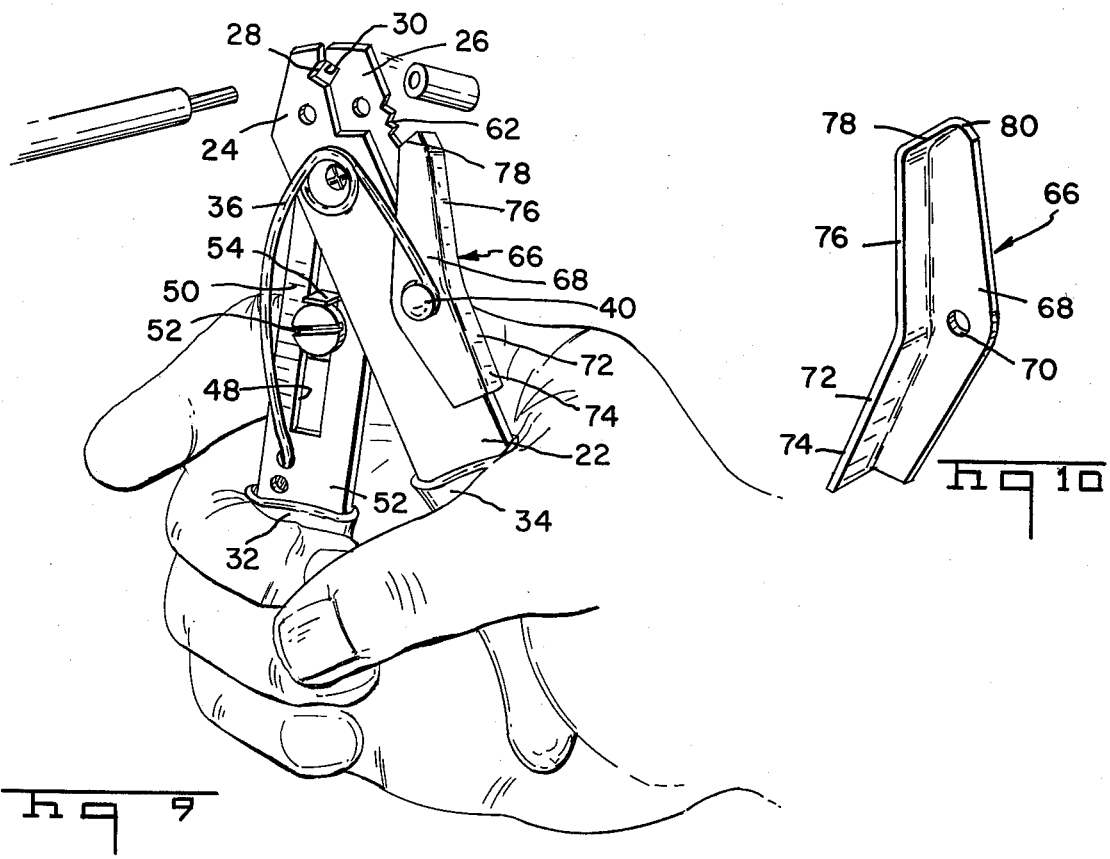
FIG. 9 is a perspective view showing the manner of holding and using the wire stripper.

The manner of using the wire stripper can best be described initially by referring to FIGS. 5-7 and 9. To strip a wire, screw 60 is loosened and stop member 52 is moved along slot 48 until it is located at a place which corresponds to the desired opening that is necessary between notches 28 and 30 on the jaws to strip the insulation off a wire without cutting the conductor. FIGS. 5, 6 and 7 show stop member 52 at various locations in slot 48 gradually closer to the jaws with the opening between the notches 28 and 30 being progressively larger since the extent to which arms 14 and 16 can be brought together is limited by element 54. It should be noted that in each of these figures surface 74 is positioned against the back face of arm 16 by the thumb as shown in FIG. 9 so that the arms can be spread to permit the jaws to open to as great an extent as is desired. In this regard, it should be appreciated that elongated member 66 is frictionally held in position on arm 16 so that it will stay in any position relative to that arm in which it is placed.

A significant advantage of the disclosed device is illustrated in connection with FIG. 8 where it will be seen that notwithstanding the location of the stop member in any of FIGS. 5-7, when the handles are released they tend to spread apart under the urging of the spring 36. Where in prior art devices the handles would be free to spread in unlimited fashion, in the disclosed device edge 80 on elongated member 66 engages the notch 62 which is furthest from the handle on arm 14 to limit the maximum spread of the arms and the jaws. Furthermore, by merely pivoting the elongated member 66 until edge 80 engages one of the notches 62, the extent to which the handles spread can be limited.

Thus, when the operator picks up the wire stripper for further work, the handles will not have sprung so far apart as to make it difficult for him to grasp both of them in the same hand.

Additionally, elongated member 66 cooperates with stop member 52 and the notches 62 so that elongated member 66 can prevent arms 14 and 16 from spreading notwithstanding the location of stop member 52. Thus all the operator need do is pivot elongated member 66 until it engages one of the notches 62 while arm 16 bears against element 54. Thus arms 14 and 16 will be restrained against moving together by stop member 52 and they will be restrained against spreading by elongated member 66.

While the invention has been described with respect to one particular embodiment, it is apparent that many other forms and embodiments will be obvious to those skilled in the art in view of the foregoing description. Thus, the scope of the invention should not be limited by that description but, rather, only by the scope of the claims appended hereto.

What is claimed is:

1. In a wire stripper of the type comprising first and second arms pivotally connected to each other to define two facing jaws with wire stripping means thereon and two handles with means for biasing the handles and jaws to an open position, the improvement comprising first means for limiting the minimum opening between said jaws to a predetermined range of openings, second means for selectively limiting the maximum opening between said handles over a predetermined range of openings said second means cooperating with said first means throughout the range of openings to prevent said arms from spreading.

2. A wire stripper as defined in claim 1 wherein said second limiting means includes a plurality of detents disposed along one of said arms, and means for selectively engaging each of said detents, said last named means being disposed on said other arm, and each of said detents correspond to a different maximum opening between said handles.

3. A wire stripper as defined in claim 2 wherein said first means comprises a stop member coupled to one of said arms and engageable with said other arm for limiting the opening between said jaws to a predetermined minimum, means for enabling said stop member to move along said one arm, means for selectively fixing said stop member to said one arm at a plurality of locations thereon to vary said minimum opening and said detents and said selective engaging means cooperate with said stop member at each of said locations to prevent said arms from spreading.

4. A wire stripper as defined in claim 2, wherein said means for engaging said detents is an elongated member, means pivoting said member to said other arm intermediate the ends of said member so that it lies along said arm with one end adjacent the handle portion of said other arm and its other end adjacent the detents on said one arm.

5. A wire stripper as defined in claim 4 wherein said detents comprise notches disposed along the rear face of said one arm.

6. A wire stripper as defined in claim 4 wherein said detents are linearly arranged along the rear face of said jaw of said one arm and said engaging member includes a stop to limit its pivotal movement in one direction, and said stop corresponds to the detents furthest from the handle of said one arm so that the maximum opening of said handles in said predetermined range is limited thereby.

7. A wire stripper as defined in claim 6 wherein said detent closest to the handle of said one arm is engaged by said engaging member when it is pivoted from said stop so that the minimum opening of said handles in said predetermined range is defined thereby.

8. A wire stripper as defined in claim 4 wherein said elongated member comprises a first portion which is pivoted to said other arm and a second portion which is coupled to said first portion, one part of said second portion being engageable by an operator to move said elongated member about said pivot, and another part of said second portion being engageable with said detents.

9. A wire stripper as defined in claim 1 wherein said first means comprises an elongated slot in one of said arms with a stop member mounted in said slot for movement therealong and means for fixing said stop member at locations along said slot to limit the opening between said jaws to a predetermined minimum so that the conductor in the wire that is stripped will not be cut, the improvement comprising said stop member being comprised of a first element extending through said slot for engagement with said other arm and a second element coupled to said first element, and means for releasably coupling said second element to said one arm along said slot.

10. A wire stripper as defined in claim 9 wherein said second element is generally bowed so that its intermediate portion is spaced from said one arm.

11. A wire stripper as defined in claim 9 including graduations disposed along said slot so that said first element can be positioned at predetermined locations.

* * * * *